Figure 1:
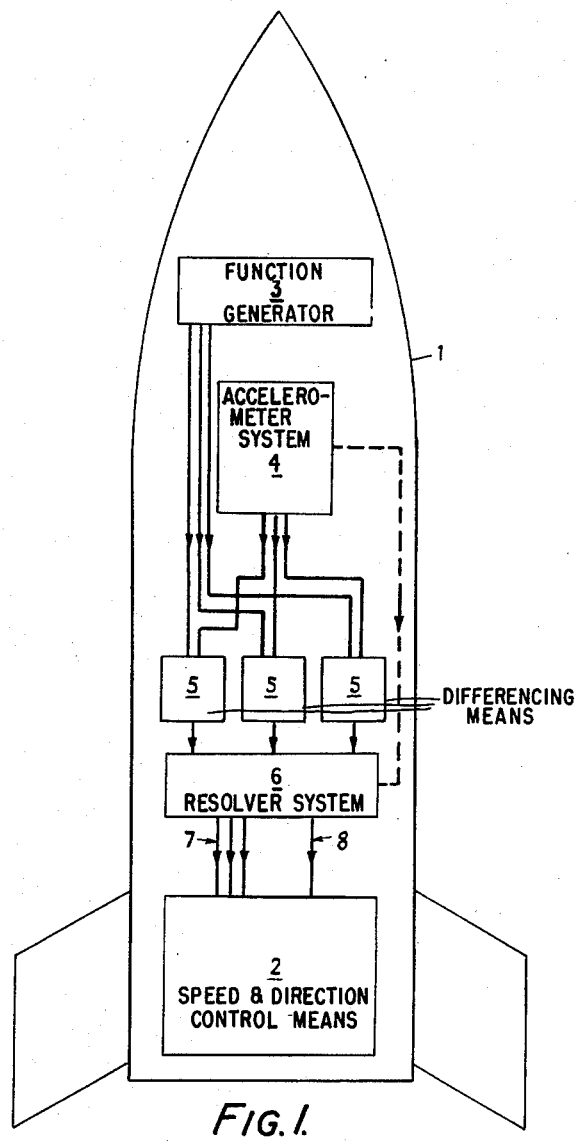

April 12, 1960 G. C. SCORGIE 2,932,467
BALLISTIC MISSILES

Filed Aug. 11, 1955 3 Sheets-Sheet 1

Guy Craig Scorgie
INVENTOR

BY
ATTORNEY

April 12, 1960 G. C. SCORGIE 2,932,467
BALLISTIC MISSILES
Filed Aug. 11, 1955 3 Sheets-Sheet 2
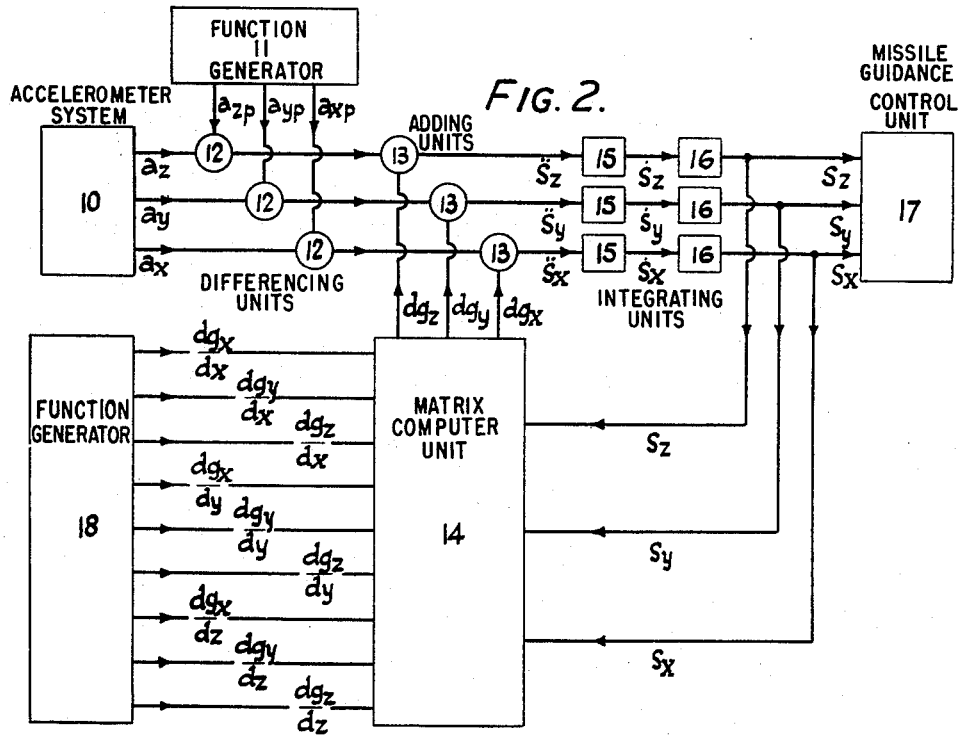
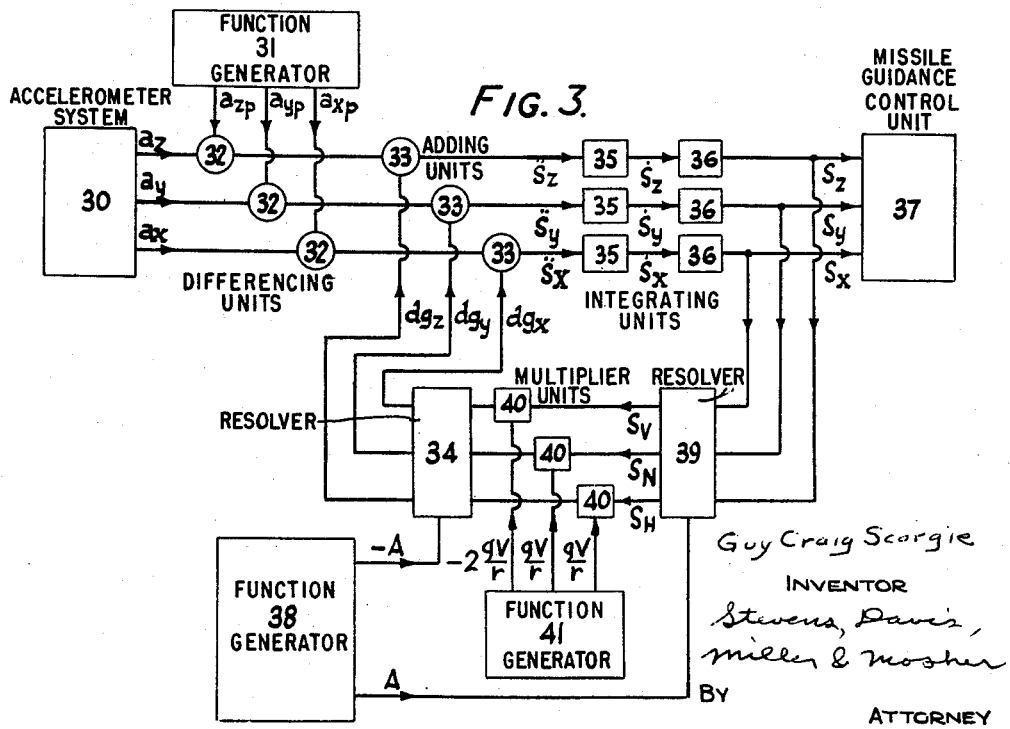
Guy Craig Scorgie
INVENTOR
Stevens, Davis,
Miller & Mosher
BY
ATTORNEY April 12, 1960 G. C. SCORGIE 2,932,467
BALLISTIC MISSILES
Filed Aug. 11, 1955 3 Sheets-Sheet 3
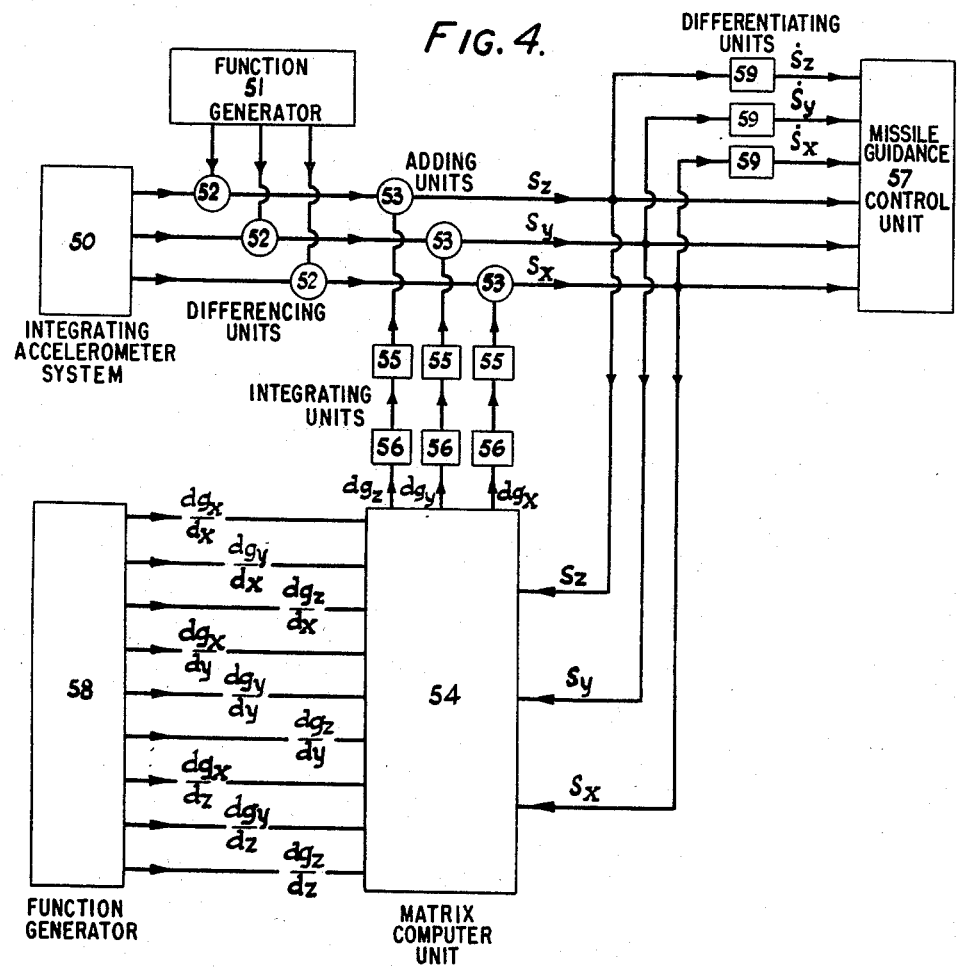
Guy Craig Scorgie
INVENTOR
BY
ATTORNEY

United States Patent Office 2,932,467
Patented Apr. 12, 1960

2,932,467
BALLISTIC MISSILES

Guy Craig Scorgie, Reading, England, assignor to The English Electric Company Limited, London, England, a corporation of Great Britain Application August 11, 1955, Serial No. 527,687

Claims priority, application Great Britain August 20, 1954

4 Claims. (Cl. 244—14)

This invention relates to the guidance of long range ballistic missiles.

According to the invention, a missile which carries a record of data relating to a predicted course and has gravity-influenced acceleration-responsive navigation means for deriving data relating to its actual course, computer means for comparing the recorded data with the derived data to produce missile guidance data, missile speed and direction control means adapted to guide the missile in response to said guidance data in a manner tending to reduce the divergence between the recorded and derived data, and error-compensation means for modifying the response of the missile control means to said guidance data in dual dependence upon said divergence and the gravitational field, and adapted to correct for variations in the gravitational effects between the actual course and the predicted course, these error-compensation means comprising a record of components of the gravitational field gradient and computer means for producing data from this record and adapted to compute from this data and said guidance data the error compensation data necessary to modify the response of the missile control means.

The record of data is preferably in a form which controls the outputs of a function generator, there being three output signals which define the predicted values of accelerometer measurements along three axes. Three accelerometers may be mounted on a table which is gyro-stabilized in the inertial frame, the axes of the accelerometers being along three directions mutually at right angles. During flight the accelerometers measure the acceleration of the missile along the said three axes minus components of the acceleration of gravity along these axes. The trajectory which the missile is required to follow is predicted in terms of the acceleration of the missile along the axes minus the components of the acceleration of gravity, that is in terms of the predicted accelerometer readings of a missile following the ideal trajectory.

A factor to consider in the guidance of a missile in the above-described way is that if the missile wanders off-course the acceleration of gravity is no longer the same at the actual position of the missile as it is at the predicted position of the missile. An exact compensation for the effects of gravity upon the measured acceleration of the missile can not be achieved in terms of programmed gravity data. It is to be noted that if the navigation of the missile is to be wholly reliant upon the inertial measurements without any occasional check on position, as by star fixes or the like, then correct navigation requires a true assessment of the acceleration of gravity at the actual position of the missile rather than at its required or predicted position. This requirement can not be met exactly by a self-contained guidance scheme because there is a practical limit to the amount of gravitational field data which can be carried by the missile. However, assuming that an adequate amount of such data is available the navigation equipment of the missile can function by a form of feedback action. Assuming that the missile is at its predicted position at any instant the value of the acceleration of gravity is known and can be applied to compensate the accelerometer measurements. The double time integrations of the compensated acceleration measurements yield a measure of the missile's true position. This position may then be compared with the required position as represented by arbitrarily programmed data. The error is the source of the control demands on the missile's guidance system; the missile is directed and accelerated or decelerated to reduce this error. However, the existence of this error invalidates the initial assumption that the missile is at its predicted position.

The consequences of this are of no importance if the acceleration of gravity is the same at the actual position as at the predicted position. For a very rapid and highly sensitive missile control the position error will always be small and the acceleration of gravity will hardly be any different at the two positions. Nevertheless, there will be a difference, however small, in any practical application. The consequences then are that if the missile has a control which gives it a damped (as opposed to an oscillatory) approach to its required flight path and if it so happens that it is following a trajectory a little below this flight path, the effect of gravity will have been underestimated. On an upward flight, this means that the vertical components of the measured acceleration will be excessive because the offset gravity correction has been too low. In other words the missile will be reckoned to be higher than it really is and even though the navigation equipment is keeping the believed position of the missile on course there will be a cumulative error which allows the missile to fall unsuspectingly further and further off its predicted upward course. This effect is partly remedied when the missile begins its downward course. Then the tendency is for the missile to rise above its predicted course.

It is the object of this invention to provide a means by which such errors arising from the differences in the acceleration at the predicted and actual positions of the missile may be compensated. The invention therefore provides an improvement in the navigation system of an inertially guided missile.

These means for compensating for the above-mentioned differences in the gravitational acceleration will now be described with reference to the accompanying drawings in which:

Fig. 1 shows in schematic form a missile of a kind in which the invention may be used.

Fig. 2 shows a schematic arrangement of an inertia guidance system incorporating one form of the invention and one method of gravitational difference compensation, Fig. 3 shows a schematic arrangement of another inertia guidance system incorporating the same form of the invention and another method of gravitational difference compensation, and Fig. 4 shows a schematic arrangement of another inertia guidance system incorporating another form of the invention with the first method gravitational difference compensation.

Referring now to Fig. 1, a missile 1 is shown to have guidance equipment comprising speed and direction control means 2, a function generator 3, and accelerometer system 4, differencing means 5 and a resolver system 6. The function generator 3 serves to produce output data along three lines, this data relating to a course which it is required that the missile 1 should follow. The data may be in digital or analogue form and may directly represent either acceleration, speed or velocity in appropriate directions of reference. The accelerometer system 4 is arranged to produce data in a similar form and relating to the same quantities. The data supplied by the function generator 3 and the accelerometer system 4 is compared in the differencing units 5 and error quantities supplied by these units are fed to the resolver system 6. Here the error quantities are resolved and integrated to provide data relating to the components of positional error between the actual position and the required position of the missile and to compensate for this error the missile must be guided in the appropriate direction and have its speed suitably controlled. Accordingly, the resolver system 6 provides data 7 which serves to control the direction of flight of the missile and it also provides data 8 which serves to control the speed of the missile. It is necessary to introduce data into the resolver system 6 which will relate the differences supplied by the units 5 with the axes of reference utilized by the whole system. For this purpose suitable data represented by the broken line is supplied from the accelerometer system 4 to the resolver system 6.

For the purpose of the following analysis it is presumed that at the instant of launching a missile the launching site is a the origin of reference. This origin is presumed to be fixed in space and is a point of intersection of the three mutually perpendicular axes. These axes are:

(i) The $x$ axis, which at the instant of launching is horizontal at the launching site and parallel to the plane of trajectory;

(ii) The $y$ axis, which at the instant of launching is horizontal at the launching site and normal to the plane of trajectory; and (iii) The $z$ axis, which at the instant of launching is vertical at the launching site.

The co-ordinates of a target with respect to these axes are determinable at any instant. From a knowledge of the approximate speed of travel of the missile and the time of launching it is possible to determine a time when it is predicted that the missile will hit the target. Consequently, allowing for the movement of the target in space, it is possible to determine where the missile should be relative to the $x$, $y$, $z$ axes when it is about to hit the target and the instant it should be there.

To follow at a predetermined speed a suitably-chosen trajectory between the origin and the co-ordinates of the target at impact the missile must accelerate and decelerate in a definite manner. A record of the predicted acceleration or deceleration when compared with the measured acceleration or deceleration affords information which may be applied correctively to guide the missile in both speed and direction. However, absolute acceleration is not easily measured and it is more simple to measure the absolute acceleration less the acceleration effects of gravity. Accordingly, the record of predicted acceleration or deceleration represents the values taking into account gravitational effects. The components of these may be expressed as $a_x$, $a_y$, $a_z$ for the measured values of acceleration in the $x$, $y$, $z$ directions respectively and $a_{xp}$, $a_{yp}$, $a_{zp}$ for the predicted values of measured acceleration in the $x$, $y$, $z$ directions respectively. Neglecting the difference in gravity between the actual position and the predicted position of the missile and denoting the components of the separation vector (that is, the line joining the actual position and the predicted position of the missile at any instant) along the $x$, $y$, $z$ axes by $s_x$, $s_y$, $s_z$ respectively, $$\ddot{s}_x = a_x - a_{xp}$$
$$\ddot{s}_y = a_y - a_{yp}$$
$$\ddot{s}_z = a_z - a_{zp}$$

Corrective forces must be such that $s_x$, $s_y$ and $s_z$ are reduced to zero. This requires that the measured accelerations must be compared with the predicted accelerations and the difference integrated twice to give quantities which should control the restoring forces in a manner tending to reduce the quantities.

A factor of error can arise because the gravitational effects are different at the actual position of the missile and at the predicted position of the missile.

The compensation of this factor of error is possible by utilizing guidance equipment of the form to be described with reference to Figs. 2, 3 or 4 of the accompanying drawings. As a preliminary to this the above analysis will be extended as follows.

Denoting the acceleration of gravity in the $x$, $y$, $z$ directions at the predicted position of the missile at a particular instant as $g_x$, $g_y$, $g_z$ respectively, the differences between these values and the values of the acceleration of gravity at the actual position of the missile when expressed as components in the $x$, $y$, $z$ directions respectively are:

$$s_x \frac{\partial g_x}{\partial x} + s_y \frac{\partial g_x}{\partial y} + s_z \frac{\partial g_x}{\partial z}$$

$$s_x \frac{\partial g_y}{\partial x} + s_y \frac{\partial g_y}{\partial y} + s_z \frac{\partial g_y}{\partial z}$$

and $$s_x \frac{\partial g_z}{\partial x} + s_y \frac{\partial g_z}{\partial y} + s_z \frac{\partial g_z}{\partial z}$$

Accordingly, to compensate for the difference in gravitational effect the corrective forces must respond to minimize the values of $s_x$, $s_y$, $s_z$ as given by the expressions:

$$\ddot{s}_x = a_x - a_{xp} + s_x \frac{\partial g_x}{\partial x} + s_y \frac{\partial g_x}{\partial y} + s_z \frac{\partial g_x}{\partial z}$$

$$\ddot{s}_y = a_y - a_{yp} + s_x \frac{\partial g_y}{\partial x} + s_y \frac{\partial g_y}{\partial y} + s_z \frac{\partial g_y}{\partial z}$$

and $$\ddot{s}_z = a_z - a_{zp} + s_x \frac{\partial g_z}{\partial x} + s_y \frac{\partial g_z}{\partial y} + s_z \frac{\partial g_z}{\partial z}$$

A schematic arrangement of apparatus suitable for controlling a guided missile is shown in Fig. 2.

The accelerometer system 0 is arranged to measure the acceleration of the missile and supplies three electrical output signals proportional to $a_x$, $a_y$, $a_z$ respectively. The function generator 11 supplies three output signals $a_{xp}$, $a_{yp}$, $a_{zp}$. The corresponding signals are compared by the three units 12 each of which has an output proportional to the expressions $a_x - a_{xp}$, $a_y - a_{yp}$, $a_z - a_{zp}$. These are combined in units 13 with signals supplied by the matrix unit 14, and the output signals are integrated firstly by the integrating units 15 and secondly by the integrating units 16 to afford output signals proportional to $s_x$, $s_y$, $s_z$. These signals are supplied to the control unit 17 which guides the missile. The function generator 18 generates signals which are proportional to the gravitational field gradient components and these are supplied to the matrix unit 14 as also are feedback signals proportional to $s_x$, $s_y$, $s_z$. The matrix unit is arranged to supply output signals to the units 13 which are related to $s_x$, $s_y$, $s_z$ and to the gravitational field gradient components in accordance with the above equations.

The form of the gravitational field gradient components will now be considered.

Consider some definite point along the ideal trajectory. Let the gravitational accelerations in the vertical, horizontal in the plane of trajectory, and horizontal normal to the plane of trajectory be respectively $g_V$, $g_H$ and $g_N$. Since gravity acts in a vertical direction $g_H$ and $g_N$ are both zero. The value of $g_V$ varies with the distance from the centre of the earth and is given by $$\frac{g_0 r_0^2}{r^2}$$

where $g_0$ is the acceleration due to gravity at the earth's surface, $r_0$ is the distance from the centre of the earth to the surface, and $r$ is the distance from the centre of the earth to the point under consideration. Consider now the gravitational accelerations at the actual position of the missile at a corresponding instant, these accelerations being resolved in the same directions as $g_V$, $g_H$ and $g_N$ above.

Since the difference between the actual and ideal positions of the missile is small relative to the radius of the earth the net acceleration due to gravity is very approximately $g_V$ as before. However, if $S_V$, $S_H$ and $S_N$ are the component displacements corresponding to the directions of $g_V$, $g_H$ and $g_N$ respectively the actual acceleration due to gravity resolved in the plane defined by the centre of the earth and the vector $S_H$ is directed to make an angle $$\frac{S_H}{r} \text{ radians}$$

approximately with $g_V$. Thus there is an actual gravitational acceleration of approximately $$-\frac{g_V}{r}S_H$$

in the $g_H$ direction. Similarly, there is an actual gravitational acceleration of approximately $$-\frac{g_V}{r}S_N$$

in the $g_N$ direction.
Thus, $$dg_H = -\frac{g_V}{r}S_H$$

where, $dg_H$ is the difference of the components of gravitational acceleration in the horizontal direction and in the predicted plane of trajectory at a point in the trajectory, the difference being between the values at the ideal and actual positions of the missile.

Similarly, $$dg_N = -\frac{g_V}{r}S_N$$

where, $dg_N$ is the difference in the components of gravitational acceleration in the horizontal direction and normal to the predicted plane of trajectory at a point in the trajectory, the difference being between the values at the ideal and actual positions of the missile.

The value of $dg_V$, the difference in the components of gravitational acceleration in the vertical direction at a point in the predicted trajectory, the difference being between the values at the ideal and actual positions of the missile is determined as follows:

$dg_V$ is equal to $-S_V \frac{dg_V}{dr}$ thus:

$$dg_V = +2g_o S_V \frac{r_0^3}{r^4}$$

$$= +\frac{2S_V}{r}g_V$$

The components $dg_V$, $dg_H$ and $dg_N$ may be resolved along the $x$, $y$, $z$ directions referred to above.

It will be noted that the component in the $y$ direction will be equal to $dg_N$. The component in the $x$ direction will equal $dg_H \cos A - dg_V \sin A$, where A is the angle swept out since the launching of the missile by the line joining the ideal position of the missile with the centre of the earth.

Also, the component in the direction $z$ will be $dg_H \sin A + dg_V \cos A$

Similarly:

$S_y = S_N$ $S_x = S_H \cos A - S_V \sin A$ and $S_z = S_H \sin A + S_V \cos A$

The expression for $\ddot{s}_x$, $\ddot{s}_y$ and $\ddot{s}_z$ become:

$\ddot{s}_x = a_x - a_{xp} - dg_V \sin A + dg_H \cos A$ $\ddot{s}_y = a_y - a_{yp} + dg_N$ $\ddot{s}_z = a_z - a_{zp} + dg_N \sin A + dg_V \cos A$ Alternatively, they are:

$$\ddot{s}_x = a_x - a_{xp} - \frac{g_V}{r}(2S_V \sin A + S_H \cos A)$$

$$\ddot{s}_y = a_y - a_{yp} - \frac{g_V}{r}(S_N)$$

$$\ddot{s}_z = a_z - a_{zp} - \frac{g_V}{r}(S_H \sin A - 2S_V \cos A)$$

or $\ddot{s}_x = a_x - a_{xp} + s_x f_1 - 3s_x f_2 - 3s_z f_3$ $\ddot{s}_y = a_y - a_{yp} - 2s_y f_1$ $\ddot{s}_z = a_z - a_{zp} + s_z f_1 + 3s_z f_2 - 3s_x f_3$ where $$f_1 = \frac{g_V}{2r} \quad (1)$$

$$f_2 = \frac{g_V}{2r}\cos 2A \quad (2)$$

and $$f_3 = \frac{g_V}{2r}\sin 2A \quad (3)$$

These three functions $f_1$, $f_2$ and $f_3$ are complex but it will be seen that the function generator 18 needs only to generate three complex functions instead of nine and the matrix unit can be arranged to respond to these in accordance with the above equations.

An alternative system of gravitational difference compensation will now be described.

It has been noted that $$dg_H = -\frac{g_V}{r}S_H$$

$$dg_N = -\frac{g_V}{r}S_N$$

$$dg_V = -\frac{g_V}{r}S_V$$

The terms $S_H$, $S_N$ and $S_V$ express components of displacement in mutually perpendicular directions, one direction of which is the direction of $r$.

It may be shown that this may be expressed vectorially by the equation:

$$(s\nabla)g = \frac{g_V}{r}(2S_V V - S_H H - S_N N)$$

where $r$ is the radius from the centre of the earth to the field point and V is the corresponding unit vector. The unit vectors V, H, N define a set of axes in which N is parallel to the $y$ axis.

Noting that A is the angle of sweep of the radius vector V, the necessary gravity corrections $dg_x$, $dg_y$ and $dg_z$ may be introduced by a pair of resolvers whose shafts are rotated according to the angles A and $-A$ respectively and a function generator for the expression $$\frac{g_V}{r}$$

A circuit operating on this principle is shown in Fig. 3. Referring to Fig. 3, the accelerometer system 30 supplies three output signals which are proportional to $a_x$, $a_y$, $a_z$ respectively. The function generator 31 supplies three output signals $a_{xp}$, $a_{yp}$, $a_{zp}$. The corresponding signals are compared by the three units 32 each of which has an output proportional to the expressions $a_x - a_{xp}$, $a_y - a_{yp}$, $a_z - a_{zp}$. These are combined in units 33 with signals supplied by the resolver 34 and the output signals are integrated firstly by the integrating units 35 and secondly by the integrating units 36 to afford output signals proportional to $s_x$, $s_y$, $s_z$. These signals are supplied to the control unit 37 which guides the missile.

The function generator 38 generates signals which are proportional to the angle A and are used to control the resolvers 34 and 39. The resolver 39 is supplied by feedback signals proportional to $s_x$, $s_y$, $s_z$ and resolves these in the directions of $g_V$, $g_H$ and $g_N$. These resolved signals are supplied to the three units 40 which receive signals $$\frac{g_V}{r}, \frac{g_V}{r} \text{ and } -2\frac{g_V}{r}$$

respectively from the function generator 41. The units 40 multiply the two incoming signals and supply output signals to the resolver 34. The output signals from the resolver 34 are resolved in the $x$, $y$, $z$ directions and supplied to units 33 as gravitational field gradient component correction signals.

It will be noted that the signals proportional to $s_x$, $s_y$, $s_z$, as supplied to the control units 17 and 37, need to be resolved along the axes of the missile before they are suitable for controlling the steering and drive mechanism of the missile.

The accelerometer systems 10 and 30 may consist of three flywheel-type accelerometers mounted orthogonally on a table held stable in space by the action of torques controlled by three single gimbal gyroscopes also mounted in the table.

The position of this table relative to the axes of the missile affords the means for resolving the components $s_x$, $s_y$, $s_z$ along these axes since the table can be made to drive a resolver whose output controls the steering and drive mechanism of the missile.

Owing to inertial effects in the operation of the control units 17 and 37 signals proportional to $\dot{s}_x$, $\dot{s}_y$, $\dot{s}_z$ may be supplied to damp out oscillatory tendencies.

Such signals are readily available from the output of the units 15 and 35. These signals will need to be resolved along the axes of the missile in the same way as the signals proportional to $s_x$, $s_y$, $s_z$ but, to simplify matters, the resolution can be carried out before the signals proportional to $\dot{s}_x$, $\dot{s}_y$, $\dot{s}_z$ are integrated.

The nature of the function generators depends upon the required accuracy of the control system. Digital methods may be adopted, the output from the accelerometers and the function generator providing the predicted accelerometer measurements in digital form.

With certain types of integrating accelerometer, the measurement of the first or second time integral of acceleration is more accurate than the measurement of acceleration itself. To utilize this to advantage in the above systems they may be modified and the value of $s_x$, say as derived from the basic equation $$\ddot{s}_x = a_x - a_{xp}$$

should be replaced by the value of $s_x$ as derived from the equation $$s_x = \int_0^t \int_0^t a_x dt.dt - \int_0^t \int_0^t a_{xp} dt.dt$$

It is noted that gravitational effects are neglected here to simplify the argument.

These integral terms are both very large in comparison with $s_x$ and in order to reduce $s_x$ with reasonable accuracy the difference between them may be obtained by digital methods.

For digital subtraction it is necessary that the output of the accelerometer should be in digital form and this is readily obtainable from the type of accelerometer consisting of a wheel or cylinder having an unbalanced mass which produces a torque under the action of acceleration. It can be arranged that a pulse is produced each time the wheel completes one revolution. Since the angular displacement of the wheel is proportional to the second time integral of missile acceleration these pulses provide the desired digital representation. A function generator in the missile may provide pulse representation of the second integral of the predicted accelerometer measurements as a function of time and it remains to form the difference between these two integrals. A principle of a method of doing this may consist in operating either of two counters, depending on which of the two pulse-trains is arriving at the faster rate. The reading of these counters are again subtracted to give the final output which may be in analogue form.

A schematic arrangement of an apparatus incorporating integrating accelerometers is shown in Fig. 4. The integrating accelerometer system 50 supplies three output signals which are proportional to $\iint a_x dt.dt$; $\iint a_y dt.dt$; $\iint a_z dt.dt$ respectively. The function generator 51 supplies three output signals $\iint a_{xp} dt.dt$; $\iint a_{yp} dt.dt$; $\iint a_{zp} dt.dt$. The corresponding signals are compared in the three units 52 each of which has an output proportional to the expressions $\iint a_x dt.dt - \iint a_{xp} dt.dt$, etc. These are combined in units 53 with signals derived from a double integration of the output of the matrix unit 54. Integrating units 55 and 56 are provided for this purpose. The integrated signals have the form $\iint dg_x dt.dt$; $\iint dg_y dt.dt$ and $\iint dg_z dt.dt$. The matrix unit 54 is similar to the unit 14 shown in Fig. 1 and is supplied by a function generator 58 and the signals $s_x$, $s_y$, $s_z$ in a similar way.

The outputs from the units 53 have the form $s_x$, $s_y$, $s_z$ and are supplied to the control unit 57 which guides the missile.

In this case stabilizing signals $\dot{s}_x$, $\dot{s}_y$, $\dot{s}_z$ are also supplied by means of the differentiating units 59.

The equipment used in a typical practical embodiment of the invention will now be described with reference to known prior art devices. This embodiment is based upon that illustrated schematically in Fig. 4 and the computations involved are analogue in form.

The accelerometer system 50 may consist of three flywheel-type accelerometers mounted orthogonally on a table held stable in space by the action of torques controlled by three single gimbal gyroscopes also mounted in the table. A gimbal mounted gyrostabilized table of this kind is fully described in the specification of U.S. Patent No. 2,109,283.

The accelerometers are preferably of the type already described. Each may consist of a wheel or cylinder having an unbalanced mass which produces a torque under the action of acceleration. In a manner much akin to that used in the acceleration integrators described in U.S. Patent No. 2,109,283, though without there being any swinging of the mass or any switching or commutation action, an electrical reaction torque is produced between the wheel or cylinder which is freely and rotatably mounted, and a balanced rotor mounted to rotate about a common axis. This torque is controlled to maintain the out-of-balance wheel or cylinder in a stable position relative to the platform. Accordingly, the out-of-balance torque set up by the acceleration of the out-of-balance mass is communicated to the balanced rotor and this rotor will move at a speed which is a measure of the time integral of the acceleration and have moved from a suitable reference datum through an angular distance which is a measure of the double time integral of the acceleration.

If the balanced rotor of each accelerometer is geared to a movable tapping on an electrical potentiometer D.C. signals having a magnitude representing the double time integrals of the measured accelerations can be produced. These signals are readily supplied through slip ring connections between the table and the frame structure of the missile to the missile's navigation computer circuitry which is not carried on the table.

This circuitry includes the function generators 51 and 58. These generators may conveniently comprise a single equipment. Twelve individual continuous control quantities require to be generated. These quantities are recorded on different tracks of a thirteen-track magnetic tape. The quantities are recorded as alternating signals whose frequencies are measures of the amplitudes of the quantities concerned. The thirteenth track records a steady frequency signal which provides a reference signal and allows, by a frequency comparison with the other recorded signals, an interpretation of a positive or negative character of each of these other signals.

The generators 51 and 58 may therefore comprise a single magnetic tape reproducing equipment through which tape bearing the record of the appropriate missile control data is fed to provide thirteen A.C. output signals. The tape is driven through the equipment at a steady speed which is preferably controlled in response to the frequency of the generated reference signal, the speed control being such as to hold this frequency equal to one derived from a master frequency reference source such as a crystal oscillator.

The twelve data signals from the reproducing equipment are compared with the reference frequency signal by suitable frequency discriminator networks which provide positive or negative D.C. output signals according to the difference frequency between each data signal and the reference signal. These D.C. signals are supplied to analogue computing elements to perform the functions already outlined with reference to Fig. 4. Fig. 4 involves the use of four types of analogue computing element. These are the differencing units 52 and 53, the integrating units 55 and 56, the differentiating unit 59, and the multiplication and summing elements involved in the matrix unit 54. Such units are well known in the computer art.

Nine of the D.C. signals represent gravitational field gradient components of the form represented in the matrix expression:

$$s_x \frac{\partial g_x}{\partial x} + s_y \frac{\partial g_x}{\partial y} + s_z \frac{\partial g_x}{\partial z}$$

$$s_x \frac{\partial g_y}{\partial x} + s_y \frac{\partial g_y}{\partial y} + s_z \frac{\partial g_y}{\partial z}$$

$$s_x \frac{\partial g_z}{\partial x} + s_y \frac{\partial g_z}{\partial y} + s_z \frac{\partial g_z}{\partial z}$$

Each of these D.C. signals needs to be multiplied by one of the quantities $s_x$, $s_y$ or $s_z$ before being added as indicated by the matrix expression to provide three D.C. output signals representing the gravity compensation components in the $x$, $y$ and $z$ directions respectively. Suitable multiplication elements may, for example, take the form shown in Fig. 6.7 on page 218 of a book entitled "Electronic Analog Computers" (1st edition) by Korn & Korn (publishers McGraw-Hill Book Company Inc., New York).

Summing and differencing functions are readily achieved by connecting output signals in series-addition or series-opposition, as is well known in the computing art. Integrating and differentiating units may conveniently take the well-known form described on pages 107 and 108 respectively of "Computers, Their Operation and Applications" (1st edition) by Berkeley and Wainwright (Publishers Reinhold Publishing Corporation, New York).

Computing elements used in the system shown in Fig. 3 and not involved in the systems of Figs. 2 or 4 are the resolvers 34 and 39. A typical resolver has the form indicated at pages 101 and 103 with reference to Fig. 15 of the book just referred to.

Before presenting the claims to this specification, the invention as described will be summarised. The invention provides compensation for the difference between the acceleration of gravity at a predicted position of the missile and at the actual position of the missile. With the system shown in Fig. 2, nine distinct records of information are shown to be required to provide this gravitational compensation. It has, however, been found that only two records of information are in fact required provided the system shown in Fig. 3 is utilised. The system shown in Fig. 3 may therefore be regarded as preferable to that shown in Fig. 2.

In Fig. 4 it is shown that the function generator 11 and accelerometer system 10 need not supply information as a direct measure of acceleration. Instead, the function generator may supply information which is a measure of the predicted position of the missile and the accelerometer system may be of a kind which will supply direct information relating to position. In effect, the integration of acceleration to give a velocity and the further integration required to give position is carried out within the system 50.

It will be appreciated that much of the data supplied by the function generators and the accelerometer system can be modified from the forms indicated provided suitable integrating or differentiating devices are incorporated at various points in the system. Thus any of the systems shown in Figs. 2, 3 or 4 may be readily modified to perform similar functions and still the requirements imposed by the mathematical equations may be satisfied.

It is noted that the invention may be applied with advantage in a system in which a missile is controlled by radar means, say, over an initial stage of flight, and then is required to move under gravity for another stage of the flight. In this case the accelerometer system should ideally not be disturbed by the motion of the missile over this latter stage of the flight but any propulsive force or drag force will be detected by the accelerometers and the system will be disturbed. However, the accelerometers may then be caused to exercise a control over the propulsive force to cause it to balance the drag force. In this particular case the record of information relating to the course to be followed by the missile is a fixed reference level corresponding to an undisturbed accelerometer system and the missile is guided to maintain the accelerometer system in a steady state.

What I claim as my invention and desire to secure by Letters Patent is:

1. A missile which carries a record of data relating to a predicted course and has gravity-influenced acceleration-responsive navigation means for deriving data relating to its actual course, computer means for comparing the recorded data with the derived data to produce missile guidance data, missile speed and direction control means adapted to guide the missile in response to said guidance data in a manner tending to reduce the divergence between the recorded and derived data, and error-compensation means for modifying the response of the missile control means to said guidance data in dual dependence upon said divergence and the gravitational field, and adapted to correct for variations in the gravitational effects between the actual course and the predicted course, these error-compensation means comprising a record of components of the gravitational field gradient and computer means for producing data from this record and adapted to compute from this data and said guidance data the error compensation data necessary to modify the response of the missile control means.

2. A missile according to claim 1, wherein the record of components of the gravitational field gradient is a record as a function of time, as they apply on the predicted course, of the nine acceleration gradients:

$$\frac{\partial g_x}{\partial x}, \frac{\partial g_x}{\partial y}, \frac{\partial g_x}{\partial z}, \frac{\partial g_y}{\partial x}, \frac{\partial g_y}{\partial y}, \frac{\partial g_y}{\partial z}, \frac{\partial g_z}{\partial x}, \frac{\partial g_z}{\partial y}, \frac{\partial g_z}{\partial z}$$

where $g$ is the acceleration of gravity, $t$ is time, and the suffixes indicate to which of the axes of reference $x$, $y$, $z$ each gravitational field gradient applies, and wherein the computer means adapted to compute from said guidance data and data reproduced from this record derives the three quantities:

$$s_x\frac{\partial g_x}{\partial x}+s_y\frac{\partial g_x}{\partial y}+s_z\frac{\partial g_x}{\partial z}$$

$$s_x\frac{\partial g_y}{\partial x}+s_y\frac{\partial g_y}{\partial y}+s_z\frac{\partial g_y}{\partial z}$$

$$s_x\frac{\partial g_z}{\partial x}+s_y\frac{\partial g_z}{\partial y}+s_z\frac{\partial g_z}{\partial z}$$

where $s_x$, $s_y$, $s_z$ are the components in the $x$, $y$, $z$ directions respectively of the distance vector representing the separation of the actual and predicted positions of the missile at any instant, as derived from the guidance data by a double integration with respect to time, and said three quantities are added respectively as correction quantities to the difference between said recorded and derived data applicable to corresponding reference axes.

3. A missile according to claim 1, wherein the record of components of the gravitational field gradient is a record as a function of time, as they apply on the predicted course, of the two quantities $$A \text{ and } \frac{g_v}{2r}$$

as defined in the body of the specification, and wherein the computer means adapted to compute from said guidance data and data reproduced from this record derives the three quantities:

$$s_xf_1-3s_xf_2-3s_zf_3$$
$$-2s_yf_1$$
$$s_zf_1+3s_zf_2-3s_xf_3$$

where $f_1$, $f_2$ and $f_3$ are as given by the Equations 1, 2 and 3 in the body of the specification and $s_x$, $s_y$ and $s_z$ are the components in the $x$, $y$, $z$ directions respectively of the distance vector representing the separation of the actual and predicted positions of the missile at any instant, as derived from the guidance data by a double integration with respect to time, and said three quantities are added respectively as correction quantities to the difference between said recorded and derived data applicable to corresponding reference axes.

4. A missile according to claim 1, wherein the record of components of the gravitataional field gradient is a record as a function of time, as they apply on the predicted course, of the three quantities $f_1$, $f_2$ and $f_3$ as given by Equations 1, 2 and 3 in the body of the specification, and wherein the computer means adapted to compute from said guidance data and data reproduced from this record derives the three quantities:

$$s_xf_1-3s_xf_2-3s_zf_3$$
$$-2s_yf_1$$
$$s_zf_1+3s_zf_2-3s_xf_3$$

where $s_x$, $s_y$, $s_z$ are the components in the $x$, $y$, $z$ directions respectively of the distance vector representing the separation of the actual and predicted positions of the missile at any instant, as derived from the guidance data by a double integration with respect to time, and said three quantities are added respectively as correction quantities to the difference between said recorded and derived data applicable to corresponding reference axes.

References Cited in the file of this patent
UNITED STATES PATENTS

| | | |
|---|---|---|
| 2,109,283 | Boykow | Feb. 22, 1938 |
| 2,492,148 | Herbold | Dec. 27, 1949 |
| 2,541,277 | Omberg | Feb. 13, 1951 |
| 2,613,071 | Hansel | Oct. 7, 1952 |
| 2,726,039 | Mosher | Dec. 6, 1955 |
| 2,762,123 | Schultz | Sept. 11, 1956 |
| 2,766,953 | Cummings | Oct. 16, 1956 |